United States Patent Office 3,265,573
Patented August 9, 1966

3,265,573
BENZOTHIADIAZINESULFONAMIDE-1,1-
DIOXIDE COMPOSITION
Martin Goldberg, New Brunswick, N.J., assignor, by mesne assignments, to E. R. Squibb & Sons, Inc., New York, N.Y., a corporation of Delaware
No Drawing. Filed July 27, 1962, Ser. No. 213,000
7 Claims. (Cl. 167—65)

This invention relates to new compositions of matter and more particularly to physiologically active compositions having included therein, as one of the active ingredients, a benzothiadiazinesulfonamide-1,1-dioxide.

Benzothiadiazinesulfonamide-1,1-dioxides are widely used as naturetic and diuretic agents. They are particularly effective in the treatment of congestive heart failure by virtue of their ability to relieve excessive water retention and to restore and maintain proper electrolyte balance. The compounds are also useful in the treatment of hypertension conditions.

Benzothiadiazinesulfonamide-1,1-dioxides alone are in general insoluble in water. The preparation of satisfactory parenterally administrable formulations of compounds having a benzothiadiazine-1,1-dioxide nucleus has been accomplished heretofore only with difficulty.

A widely used method for producing parenterally administrable dosage forms involves the preparation of a strongly alkaline solution of the compound, e.g., an 0.1 molar sodium hydroxide solution, sterilizing that solution, rapidly freezing the solution before extensive degradation or hydrolysis takes place and subliming off the water in vacuo, i.e., by lyophilization. This procedure provides a relatively dry, sterile product which may be reconstituted with water for injection or 5% dextrose or saline and which demonstrates sufficient stability for relatively short periods of time.

Such a procedure, however, introduces two distinct disadvantages. A particular disadvantage is the high degree of alkalinity required to dissolve the benzothiadiazinesulfulfonamide-1,1-dioxide. The pH of the solution is inordinately high and results in pain and irritation at the site of injection, in addition to poor long-range stablity of the solution. In addition, the process of preparing the formulation is both cumbersome and costly. Lyophilization, in particular, requires sizeable equipment which is both expensive to install and to operate.

It has now been found that compositions for parenteral administration, containing a benzothiadiazinesulfonamide-1,1-dioxide as a principal active ingredient, may be formulated by simple procedures which avoid the need for lyophilization and which provide stable products, non-irritating in use. These and other advantages accrue from the surprising discovery that the compositions of this invention provide rapid biological response.

It is an object of this invention to provide stable, parenterally administrable compositions with an improved tolerance level containing a benzothiadiazinesulfonamide-1,1-dioxide. The term "parenterally administrable" comprehends solutions as well as preparations requiring reconstitution with physiologically acceptable solubilizing mediums for parenteral administration.

The compositions of this invention comprise an intimate combination of a benzothiadiazinesulfonamide-1,1-dioxide, a liquid pharmaceutical vehicle and/or a physiologically acceptable organic solvent, the benzothiadiazinesulfonamide-1,1-dioxide being present in a concentration of at least 0.01%.

According to this invention, a benzothiadiazinesulfonamide-1,1-dioxide is intimately blended with a physiologically acceptable organic solvent and/or a liquid pharmaceutical carrier. This blending results in a non-irritating, parenterally administrable product. The blended benzothiadiazinesulfonamide-1,1-dioxide, organic solvent and/or liquid carrier composition is, in addition to the foregoing, storeably stable over extended periods of time at about room temperature and above without any substantial loss of therapeutic potency. Thus, the benzothiadiazinesulfonamide-1,1-dioxide composition may be stored in liquid form, ready for use in parenteral administrations thereof, over extended periods without loss of therapeutic value.

Compounds having the benzothiadiazine 1,1-dioxide nucleus to which this invention is applicable include compounds of the general formula

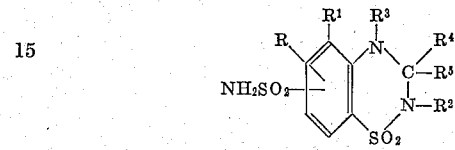

wherein the 3,4-position is double bonded or saturated, R is hydrogen, halogen, trihalomethyl, lower alkyl, lower alkoxy, nitro or amino, $R_1$ is hydrogen, halogen or lower alkyl, $R_2$ is hydrogen or lower alkyl, $R_3$ is hydrogen or lower alkyl, $R_4$ is hydrogen, lower alkyl, halo-lower alkyl, dihalo-lower alkyl, mononuclear aralkyl, mononuclear aralkyl-mercaptoalkyl, and mononuclear arylmercaptoalkyl, and $R_5$ is hydrogen or lower alkyl. Methyl, ethyl, propyl, isopropyl, butyl, etc., are illustrative of the lower alkyl groups; methoxy, ethoxy, propoxy, isopropoxy and the like are illustrative of the lower alkoxy groups; benzyl, phenethyl, α-methylphenethyl, and the like are illustrative of the mononuclear aralkyl groups; and phenyl, halophenyl, and lower alkylphenyl are illustrative of the aryl groups. Any of the four halogens i.e., fluorine, chlorine, bromine and iodine may be present in the halogenated radicals.

Examples of such benzothiadiazinesulfonamide-1,1-dioxides are 6-trifluoromethyl-7-sulfamyl-1,2,4-benzothiadiazine 1,1-dioxide,
5-trifluoromethyl-7-sulfamyl-1,2,4-benzothiadiazine 1,1-dioxide,
7-trifluoromethyl-5-sulfamyl-1,2,4-benzothiadiazine 1,1-dioxide,
6-trifluoromethyl-7-sulfamyl-3,4-dihydro-1,2,4-benzothiadiazine 1,1-dioxide,
6-trifluoromethyl-3-benzyl-7-sulfamyl-3,4-dihydro-1,2,4-benzothiadiazine 1,1-dioxide,
6-chloro-7-sulfamyl-1,2,4-benzothiazine 1,1-dioxide,
6-chloro-7-sulfamyl-3,4-dihydro-1,2,4-benzothiadiazine 1,1-dioxide,
6-chloro-3-benzyl-7-sulfamyl-3,4-dihydro-1,2,4-benzothiadiazine 1,1-dioxide,
6-chloro-3-dichloromethyl-7-sulfamyl-3,4-dihydro-1,2,4-benzothiadiazine-1,1-dioxide,
6-chloro-3-benzylmercaptomethyl-7-sulfamyl-1,2,4-benzothiadiazine 1,1-dioxide,
6-chloro-3-benzylmercaptomethyl-7-sulfamyl-3,4-dihydro-1,2,4-benzothiadiazine-1,1-dioxide,
6-trifluoromethyl-3-benzylmercaptomethyl-7-sulfamyl-3,4-dihydro-1,2,4-benzothiadiazine-1,1-dioxide, and
6-chloro-3-phenylmercaptomethyl-7-sulfamyl-3,4-dihydro-1,2,4-benzothiadiazine-1,1-dioxide.

The liquid pharmaceutical carrier contemplated in the practice of this invention is a glyceridic oil. The glyceridic oils which may be successfully employed include the edible, physiologically acceptable oils and include such oils as edible vegetable oils such as sesame oil, corn oil, cottonseed oil, castor oil, coconut oil, peanut oil and the like, edible animal oils and edible marine oils such as cod liver oil, whale oil and the like. Castor oil and sesame oil have been found to be most satisfactory although the other glyceridic oils also give excellent results.

The physiologically acceptable organic solvents which are employed in the practice of this invention are those which have been found to solubilize and act, in a liquid vehicle, as a preservative for, the benzothiadiazinesulfonamide-1,1-dioxide. The organic solvents which may be employed include the amides of a hydrocarbon carboxylic acid of less than ten carbon atoms such as N,N-dimethyl acetamide, N,N-diethylacetamide, N-ethylacetamide, N,N-dimethylprokionamide, N,N-dimethylbutyramide, substituted dioxolanes such as 2,2-dimethyl-1,3-dioxolane-4-methanol, esters of benzoic acid, such as benzyl benzoate and ethylbenzoate. Dimethyl acetamide has been found to be most satisfactory, although the other solvents also give excellent results.

The amounts of the respective ingredients present in any one particular composition of the instant invention will of necessity depend on certain factors. However, it has been found that the amount of benzothiadiazinesulfonamide-1,1-dioxide which may be employed in the practice of this invention may vary from about 0.1% to about 10% by weight of the final composition, depending upon the particular compounds employed and the requirements of the particular patient being treated. The amount of the liquid pharmaceutical vehicle which may be employed in the practice of this invention can vary from about 30 to about 99% by volume of the final product.

The amount of organic solvent employed in this invention should be sufficient to completely solubilize the benzothiadiazinesulfonamide-1,1-dioxide employed and will of necessity depend upon the amount of said benzothiadiazinesulfonamide present in the particular composition. However, it has been found that successful results are obtained when the amount of organic solvent employed is from about 1 to about 50% by volume of the final product. In the most preferable embodiment of this invention, the combination of 0.5 to 1.5% of benzothiadiazinesulfonamide-1,1-dioxide, 88.5 to 98.5% of pharmaceutical carrier and 1 to 10% of organic solvent are intimately combined to produce the final product.

The compositions of this invention are obtained by an intimate blending of the ingredients. The blending may be accomplished in any manner known to the art to obtain such results, as by continuous mixing. Although the method of addition of the components to produce the final product is not restricted, it is preferred to first admix the organic solvent with the benzothiadiazinesulfonamide-1,1-dioxide and then blend with the pharmaceutical carrier to form the final product.

The blended composition is preferably maintained or stored in that form in closed sterile containers such as vials, ampules and the like until they are to be used. The composition may be stored in containers adaptable for injection in proper proportions to produce the required dosage which normally falls within the range of about 1 to 500 mg. depending upon the potency of the particular benzothiadiazinesulfonamide-1,1-dioxide compound used. The usual single dose of injectable is about 1 to 3 cc.

Compositions of this invention contain various auxiliary substances, such as preservatives, for example, benzyl alcohol; to prevent microbiological contamination. In addition, other active medicaments may be included.

The benzothiadiazinesulfonamide - 1,1 - dioxides are readily prepared by heating an appropriately substituted disulfamylaniline with formic acid or a functional reactive derivative thereof, for example, an aldehyde, acetal, ketone or ketal. Thus, by way of illustration, 5-trifluoromethyl-2,4-disulfamylaniline can be reacted with formic acid, formaldehyde or phenyl acetaldehyde, to produce, respectively, 6-trifluoromethyl-7-sulfamyl-1,2,4-benzothiadiazine-1,1-dioxide, 6-trifluoromethyl-3-benzyl-7-sulfamyl-3,4-dihydro-1,2,4-benzothiadiazine-1,1-dioxide.

The sterility of the final composition and of the ingredients thereof may be maintained throughout the processing by sterilization of all the components prior to blending to produce the final sterile product or, alternatively, the final product may be sterilized after its production or after it has been packaged in the individual dosage containers and before it is stored.

This invention may be illustrated by the following examples:

Example 1

Ten mg. of 3-benzyl-3,4-dihydro-6-trifluoromethyl-7-sulfamyl-1,2,4-benzothiadiazine is dissolved in 0.1 cc. of N,N-dimethylacetamide. The resulting solution is then diluted with stirring to 1 cc. volume by the addition of castor oil. The solution is then sterilized by filtration through a sterilizing filter (i.e., an unglazed, porcelain candle). The sterilized solution is then placed in vials and stored.

Example 2

The procedure set forth in Example 1 is followed except that 0.015 g. of benzyl alcohol is added to the sterilized solution.

Example 3

25 mg. of 6-trifluoromethyl-7-sulfamyl-3,4-dihydro-1,2,4-benzothiadiazine-1,1-dioxide is dissolved in 0.2 cc. diethylacetamide. The resultant solution is then diluted to a volume of 1 cc. by the addition of castor oil. This composition is then sterilized by autoclaving in sealed containers for 30 minutes.

Example 4

Fifteen mg. of 6-chloro-7-sulfamyl-3,4-dihydro-1,2,4-benzothiadiazine-1,1-dioxide is dissolved in 0.5 cc. of N,N-dimethylacetamide. The resultant solution is then diluted with stirring to a volume of 1 cc. by the addition of castor oil. The resultant composition is then sterilized by filtration through a cellulose membrane filter and is then put in steel containers and stored.

Example 5

Five mg. of 6-trifluoromethyl-7-sulfamyl-3,4-dihydro-1,2,4-benzothiadiazine-1,1-dioxide is dissolved in 0.4 cc. of benzylbenzoate at a temperature of 70° C. The resultant solution is then diluted to a volume of 1 cc. by the addition of sesame oil. The resultant composition is sterilized in acordance with the procedure set forth in Example 1.

Example 6

Ten mg. of 3-benzyl-3,4-dihydro-6-trifluoromethyl-7-sulfamyl-1,2,4-benzothiadiazine-1,1-dioxide is dissolved in 0.1 cc. of N,N-dimethylacetamide. To this solution 0.015 g. of benzyl alcohol is added along with 0.35 cc. of sesame oil. The resultant solution is then diluted with stirring to a volume of 1 cc. by the addition of castor oil. The composition is then sterilized by filtration through a sterilizing filter (i.e., asbestos mat) placed in sealed containers and stored.

This invention may be variously otherwise embodied within the scope of the appended claims.

What is claimed is:

1. A sterile composition for parenteral administration comprising benzothiadiazinesulfonamide-1,1-dioxide, a liquid physiologically acceptable glyceridic oil and a physiologically acceptable organic solvent selected from the group consisting of amides of a hydrocarbon carboxylic acid of less than ten carbon atoms, 2,2-dimethyl-1,3-dioxolane-4-methanol, benzyl benzoate and ethyl benzoate.

2. A composition as in claim 1 wherein the liquid physiologically acceptable glyceridic oil is sesame oil and the organic solvent is dimethyl acetamide.

3. A composition of claim 1 wherein the liquid glyceridic oil is castor oil and the organic solvent is dimethylacetamide.

4. A sterile composition for parenteral administration comprising about 0.1 to 10% of a benzothiadiazinesulfonamide-1,1-dioxide, about 30 to 99% of a liquid physiologically acceptable glyceridic oil and about 1 to about 50% of a physiologically acceptable organic solvent selected from the group consisting of amides of hydrocarbon carboxylic acid of less than ten carbon atoms, 2,2-dimethyl-1,3-dioxolane-4-methanol, benzyl benzoate and ethyl benzoate.

5. The composition of claim 4 wherein the benzothiadiazinesulfonamide-1,1-dioxide is 3-benzyl-3,4-dihydro-6-(trifluoromethyl) - 1,2,4-benzothiadiazine-7-sulfonamide-1,1-dioxide.

6. The composition of claim 5 wherein the liquid physiologically acceptable glyceridic oil is castor oil and the organic solvent is dimethylacetamide.

7. A sterile composition comprising about 0.1 to 10 parts of 6-trifluoromethyl-3-benzyl-7-sulfamyl-3,4-dihydro-1,2,4-benzothiadiazine-1,1-dioxide, about 30 to 99 parts of a liquid glyceridic oil and about 1 to 50 parts of a physiologically aceptable organic solvent selected from the group consisting of dimethylacetamide, diethylacetamide, ethylacetamide, dimethylpropionamide, dimethylbutyramide, 2,2-dimethyl-1,3-dioxolane-4-methanol, benzyl benzoate and ethyl benzoate.

References Cited by the Examiner
UNITED STATES PATENTS

| | | | |
|---|---|---|---|
| 2,671,748 | 3/1954 | Crooks | 167—82 |
| 2,805,232 | 9/1957 | Baade et al. | 167—82 |
| 2,980,584 | 9/1961 | Hammer | 167—82 |
| 3,002,973 | 10/1961 | Zaugg et al. | 167—65 |
| 3,008,876 | 11/1961 | Bracknell et al. | 167—65 |
| 3,009,911 | 11/1961 | McManus | 167—65 |
| 3,075,882 | 1/1963 | Sponnoble et al. | 167—74 |
| 3,081,230 | 3/1963 | Weinstock et al. | 167—65 |
| 3,102,882 | 9/1963 | McManus | 167—65 |
| 3,105,793 | 10/1963 | Lobel | 167—82 |

FOREIGN PATENTS 963,551  10/1957  Germany.

OTHER REFERENCES

Goodman & Gilman: Pharmacological Basis of Therapeutics, 2nd edition, 1955, page 7, col. 1, first full paragraph.

Ashton et al.: Chemistry and Industry (Great Britain), Sept. 17, 1955.

Hizon et al.: Jour. Am. Pharm. Assoc., Scien. Ed., March 1956, 45: 3.

Garry: Amer. J. Med. Sci., September 1958, 236: 3, pp. 330, 334–5.

Gans. et al.: Jour. Am. Pharm. Assoc., Scien. Ed., Oct. 5, 1957, XLVI: 10, pp. 587–591, especially page 589, paragraph "N,N'-Dimethyl Acetamide."

JULIAN S. LEVITT, *Primary Examiner.*

FRANK CACCIAPAGLIA, JR., *Examiner.*

E. FRANK, J. D. GOLDBERG, *Assistant Examiners.*